No. 809,007. PATENTED JAN. 2, 1906.
H. W. OSTER.
MACHINE FOR CUTTING DIES FOR DIE STOCKS.
APPLICATION FILED APR. 17, 1905.
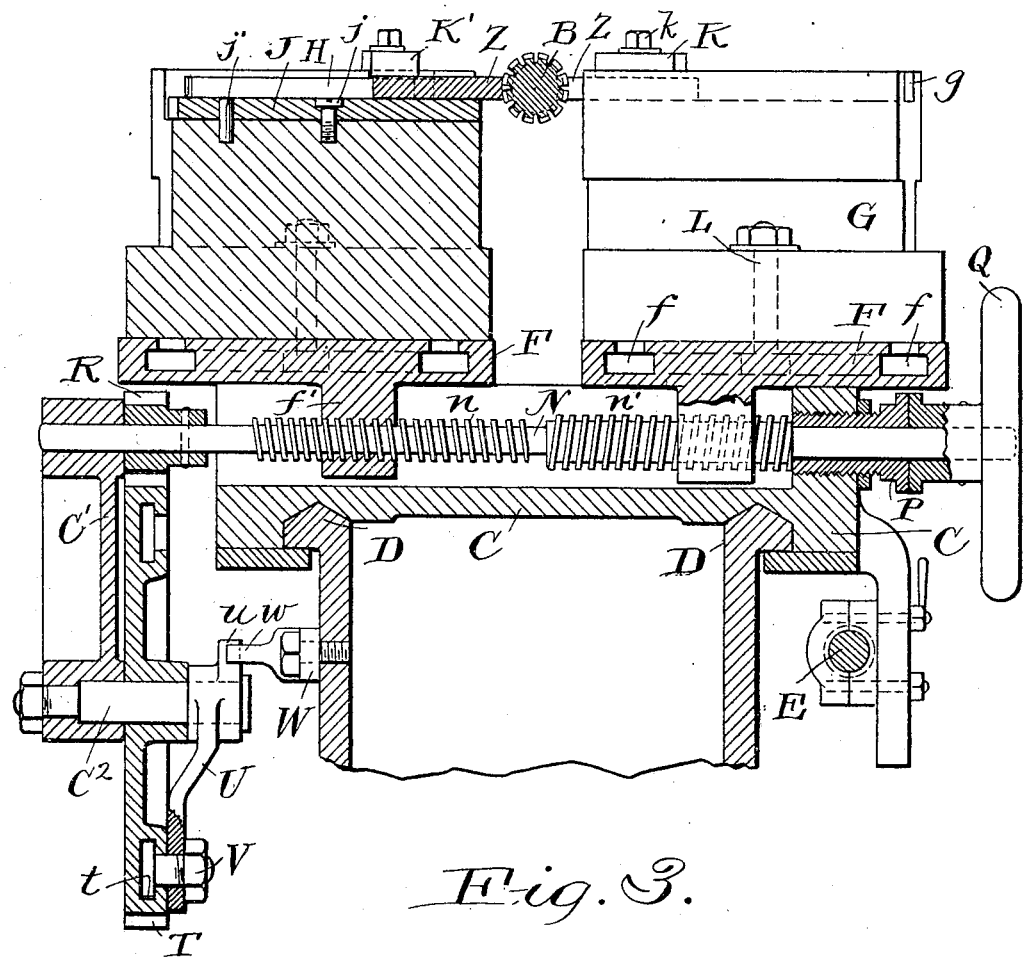
Fig. 3.
Fig. 4.
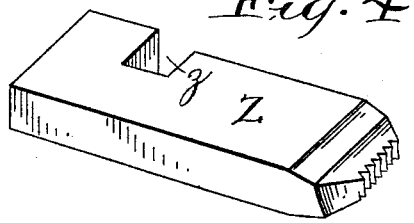
Witnesses.
E. B. Gilchrist.
J. S. Kohn
Inventor:
Herman W. Oster,
By his Attorneys,
Thurston & Bates.

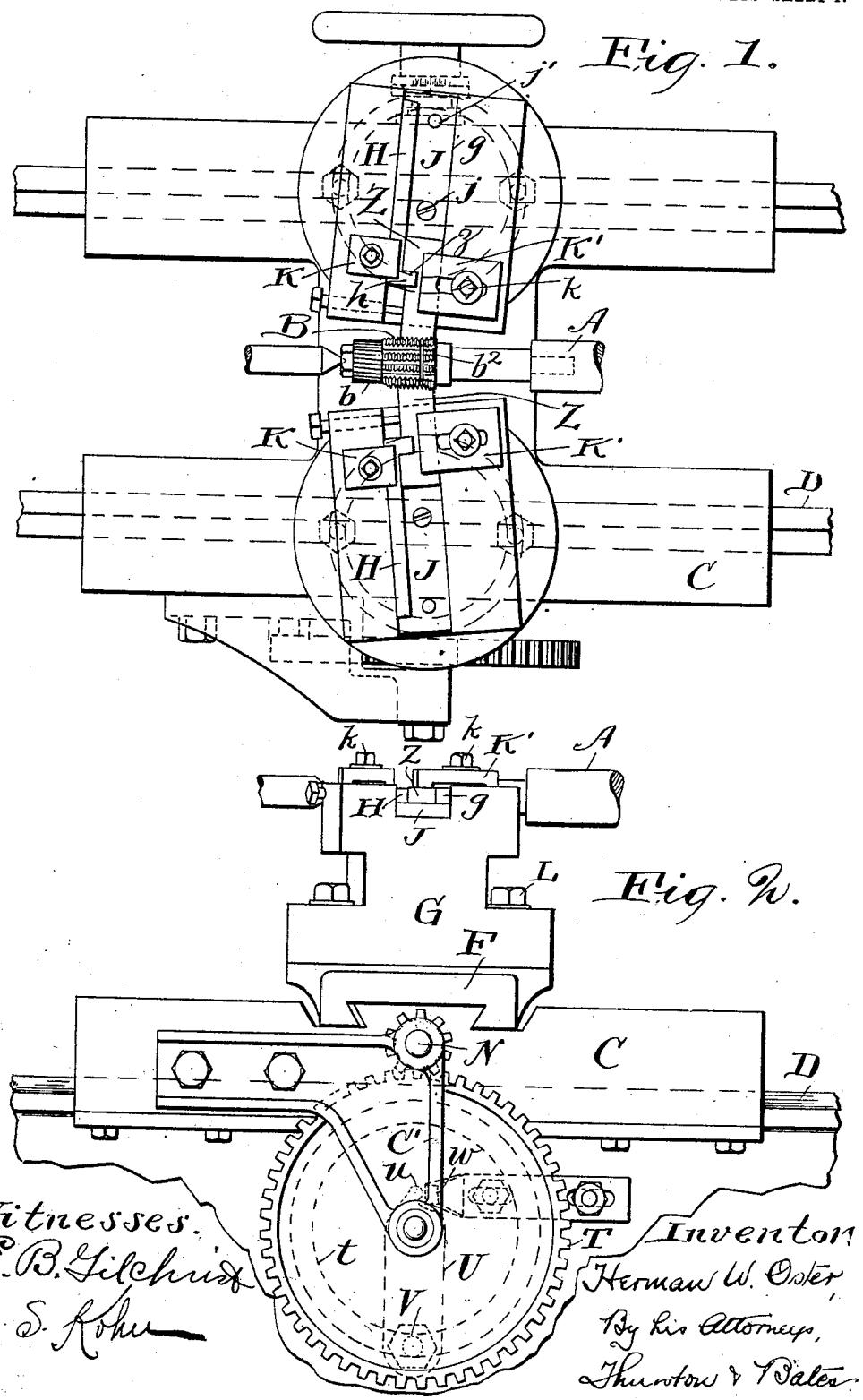

UNITED STATES PATENT OFFICE.

HERMAN W. OSTER, OF CLEVELAND, OHIO, ASSIGNOR TO THE OSTER MANUFACTURING COMPANY, OF CLEVELAND, OHIO, A CORPORATION OF OHIO.

MACHINE FOR CUTTING DIES FOR DIE-STOCKS.

No. 809,007.　　　　Specification of Letters Patent.　　　　Patented Jan. 2, 1906.

Application filed April 17, 1905. Serial No. 255,884.

*To all whom it may concern:*

Be it known that I, HERMAN W. OSTER, a citizen of the United States, residing at Cleveland, in the county of Cuyahoga and State of Ohio, have invented a certain new and useful Improvement in Machines for Cutting Dies for Die-Stocks, of which the following is a full, clear, and exact description, reference being had to the accompanying drawings.

The dies or chasers which are used in die-stocks have usually parallel top and bottom faces, and in the top face is usually a notch which receives the ribs on a cam-plate by which the dies are moved toward and from the axis of the die-stock. The threads which are cut on one end of these dies must all be the same distance from the notches referred to, so that when the dies are in the die-stock all of the threaded ends will be precisely the same distance from the axis of the die-stock. It is also desirable that the threaded end of each die shall be concaved to correspond with the curvature of the pipe to be threaded, and it is further desirable that the face of the threads shall incline away from the axis of the die-stock from top to bottom and that this inclination shall be rather pronounced at the bottom or part of the die on which are the roughing-threads.

The object of the invention is to provide mechanism for rapidly and cheaply cutting the threads to form dies having the above-named characteristics.

One of the important features of my machine is mechanism to automatically stop the cut when the dies have been formed, preventing that portion of the cutter which makes the roughing-threads from engaging and marring the threads cut in advance thereof.

The invention is hereinafter more fully described, and its essential characteristics set out in the claims.

In the drawings, Figure 1 is a plan, and Fig. 2 a side elevation, of my machine. Fig. 3 is a vertical cross-section thereof. Fig. 4 is a perspective view of the completed die.

The machine may be an adaptation of a lathe or a milling-machine. The rotating spindle A carries the cutter B, which consists of three sections—viz., a cylindrical roughing part $b$, a cylindrical screw-threaded portion, and beyond that a flaring frusto-conical threaded portion $b^2$. The carriage C is slidable upon ways D in a direction parallel with the axis of the cutter, being moved by a feed-screw E. Slidably mounted in transverse grooves on the carriage are a pair of plates F, to which the die-holding blocks G are adjustably bolted, as hereinafter explained.

The blocks G have in their upper faces recesses $g$, in which the dies to be cut are held. The dies are indicated in the drawings by Z. They have on their upper edges notches $z$. In Fig. 1 the dies appear lying on their flat sides. Occupying the recess $g$ is a bottom plate J, held in the recess by a screw $j$ and a pin $j'$. On the plate J, at the edge of the recess $g$, is a bar H, on the front end of which is an inwardly-extending toe $h$. This toe is adapted to occupy the notch $z$ in the die. The edge of the bar H immediately adjacent to the toe engages the edge of the die between the notch and the outer end. The parts are held in place by the clips K and K', bolted to the upper face of the die-holding blocks G. By replacing the plate J and the bar H with different-sized members the machine is adapted to hold different sizes of dies.

The die-holding blocks G are adjustably secured to the plates F by clamping-bolts L, which have T-heads extending down into undercut circular grooves $f$ in the plate F. By this means the blocks may be turned about on an axis to present the dies to the cutter at various angles, so that the dies may be formed to cut any taper desired. When in place, the dies are rigidly held to the plates F through the intermediacy of the clamps and blocks, and hence an adjustment of these plates adjusts the position of the dies. These plates may be caused to approach each other or to recede by the rotation of a transverse shaft N, adjustably mounted in the carriage. This shaft has on it right and left hand threads $n$ and $n'$, respectively, which engage with depending nuts $f'$ of the plates F.

The shaft N is journaled at its outer end in a bracket C', which is bolted to the carriage C. On the front side of the machine the shaft N is journaled in a suitable bushing P, which is screwed into the carriage and clamped by a suitable jamb-nut. On the end of the shaft is a hand-wheel Q, by which it can be rotated. The hand-wheel thus causes the dies to approach or recede to present them in proper position to the cutter. When the dies are thus presented and the feed-screw E rotated, the carriage is fed forward and the dies are properly cut by the cutter B. The bushing P and the hand-wheel Q have projecting flanges adjacent to their meeting faces, and suitable marking on these flanges enables the adjustment of the holders to be critically varied.

As stated, the cutter has at the base of its cylindrical cutting part $b'$ a flaring cutting part $b^2$, which is adapted to form tapered roughing-threads on the dies. Now it is essential to stop the cutting at exactly the right point; otherwise the roughing-cutter will cut out either too much or too little of the parallel threads cut by the cutter $b'$ and, moreover, dies cut at different times would vary so that they would not be interchangeable, and the four dies associated in the die-stock might not be capable of efficient coöperation. Therefore I provide mechanism to stop automatically the feed of the dies to the cutter at just the right point. This will now be described.

Secured to the screw-shaft N, between the bracket C' and the body of the carriage, is a pinion R, and this pinion meshes with a spur-gear T, journaled on a stud $C^2$, rigid with the bracket C'. Journaled on this stud on the inner side of the spur-gear T is an arm U, which is adjustably clamped to the spur-gear by means of a bolt and nut V, the bolt having a T-head, which extends into an undercut annular groove $t$ on the face of the spur-gear. Extending from the arm U on the opposite side of its journal is a toe $u$, which is adapted in the movement of the carriage to engage a outward projection $w$ on a bar W, adjustably but rigidly secured to the frame of the machine. Now just as the carriage is reaching the position where the cut is completed the toe $u$ impinges against the projection $w$ and the forward movement of the carriage causes the arm U to communicate a portion of a rotation to the spur-gear T, which rotates the pinion R, screwing the die-holders away from each other to stop the cut. The dies are by this means screwed far enough apart so that the cutter could pass idly entirely through them. The bar W is adjustably held, by means of bolts passing through slots, to the frame. By the adjustment of the bar W and the arm U the stoppage of the cutting action may be regulated to a nicety.

Having thus described my invention, I claim—

1. In a machine for cutting dies, the combination of a rotatable cutter, a carriage movable in a path parallel to the axis of the cutter, a pair of plates upon said carriage on opposite sides of the cutter and simultaneously adjustable toward and from each other, a pair of die-holding blocks mounted respectively on vertical axes upon said plates and having die-holding recesses in their top faces adapted to hold dies on their flat sides extending radially from the cutter, means for holding said blocks immovable upon said plates, clamps for holding the dies in said recesses, and means for automatically causing the plates to separate at a predetermined point in the feed movement of the carriage.

2. The combination of a frame, a carriage mounted to slide thereon, holders transversely mounted on the carriage, a right and left hand screw mounted on the carriage and operating said holders, mechanism mounted on the carriage for turning said screw, and an arm secured to the frame and adapted to engage with and operate the screw-turning mechanism when the latter is brought in contact with said arm by the movement of said carriage.

3. The combination with the frame, a rotatable cutter, a carriage mounted on the frame and slidable parallel with the axis of the cutter, a pair of holders mounted on the carriage on opposite sides of the cutter, mechanism mounted on the carriage and operating to move the holders toward or from each other, a pinion for operating said mechanism, a geared member engaging said pinion, and a projection carried by said geared member and adapted to engage a projection carried by the frame.

4. The combination of the frame, a carriage slidable thereon, a pair of die-holders mounted on the carriage and transversely movable, a right and left hand screw transversely mounted in the carriage, a pinion on the shaft of said screw, a gear mounted on the carriage and engaging said pinion, a projection adjustably connected to said gear and a coöperating projection carried by the frame of the machine.

5. The combination of the frame, a carriage slidable thereon, die-holders transversely movable upon said carriage, a right and left hand screw journaled in the carriage, a pinion on said screw, a gear engaging said pinion, an arm journaled concentrically with said gear, an arcual undercut groove in said gear, a T-headed bolt seated in such groove and clamping the arm to the gear, a projection carried by said arm and a coöperative projection mounted on the frame.

In testimony whereof I hereunto affix my signature in the presence of two witnesses.

HERMAN W. OSTER.

Witnesses:
ALBERT H. BATES,
J. M. WOODWARD.